Aug. 14, 1956     J. W. WESTFALL     2,758,321
REINFORCED PLASTIC CONSTRUCTION AND METHOD OF MANUFACTURE
Original Filed Dec. 7, 1949     2 Sheets-Sheet 1
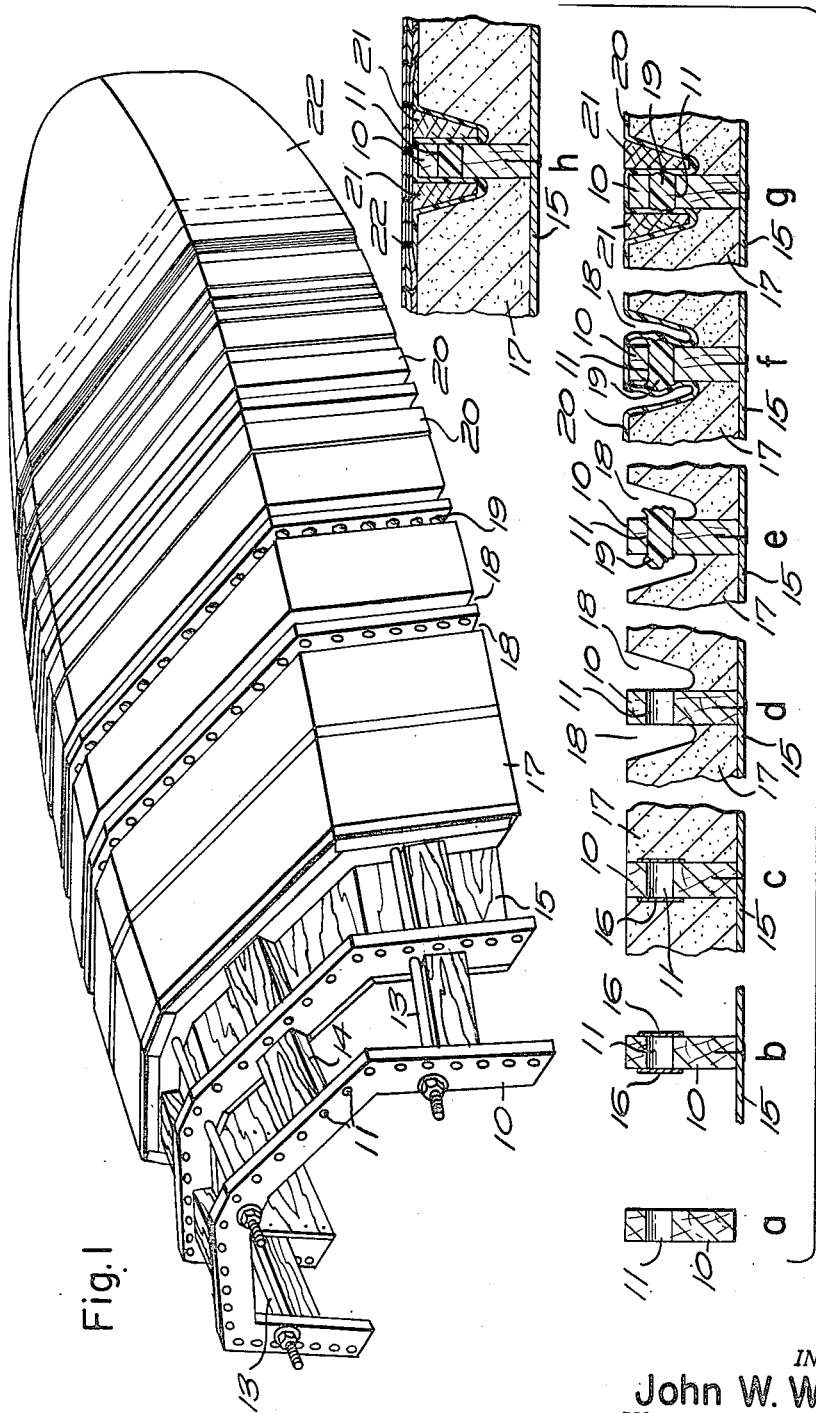
INVENTOR.
John W. Westfall
BY
ATTORNEY Aug. 14, 1956 J. W. WESTFALL 2,758,321
REINFORCED PLASTIC CONSTRUCTION AND METHOD OF MANUFACTURE
Original Filed Dec. 7, 1949 2 Sheets—Sheet 2

INVENTOR.
John W. Westfall
BY
ATTORNEY

United States Patent Office 2,758,321
Patented Aug. 14, 1956

2,758,321

REINFORCED PLASTIC CONSTRUCTION AND METHOD OF MANUFACTURE

John W. Westfall, Barrington, R. I., assignor to Anchorage Plastics Corporation, Warren, R. I., a corporation of Rhode Island Substituted for abandoned application Serial No. 131,680, December 7, 1949. This application January 5, 1956, Serial No. 557,558

12 Claims. (Cl. 9—6)

My present invention relates to a method of molding structural members into a plastic shell so that the members so molded in become an integral part of the shell. The invention also resides in the finished product obtained by the novel method.

This application constitutes a refiling of my original application Serial No. 131,680, filed December 7, 1949, now abandoned.

While the present invention may be employed for forming any type of plastic shell requiring structural frames, it was originally designed for the manufacture of a plastic boat hull having reinforcing frames permanently bonded thereto.

The principal object of the present invention is to provide a method of molding structural reinforcing members into a shell or boat hull comprising low pressure glass reinforced polyester resin laminates such that the reinforcing members so molded in become an integral part of the shell or hull.

Another object of the present invention is to provide a bonded joint for applying strengthening ribs to plastic boat hulls which is simple and inexpensive to manufacture and assemble.

A further object of the present invention is to provide a bonded joint between a plastic shell and a reinforcing member which increases the area of adhesion and provides a hooked in construction which is substantially impossible to loosen.

A further feature of the present invention is that it provides a method of molding a plastic shell which uses an inexpensive mold that permits speed and economy in assembly.

Another object of the present invention is to provide a plastic, reinforced boat having a non-oxidizing surface, substantially no maintenance charges, one which is impervious to salt water, which may be readily pigmented, and which has strength and resiliency so that it will not dent or break.

With the above and other objects and advantageous features in view, my invention consists of a novel method of manufacture and a novel arrangement of parts, more fully disclosed in the detailed description following, in conjunction with the accompanying drawings, and more particularly defined in the appended claims.

In the drawings:

Fig. 1 is a perspective view of a boat hull illustrating the successive steps in the method of manufacture in accordance with my invention.

Fig. 2 is a series of sections through the bonded joint, illustrating the successive steps in the manufacture and assembly.

The art of molding plastic material has now become quite advanced, and the manufacture of large items, such as boats has been accomplished.

However, large surfaces of comparatively thin plastic material often require strengthening ribs to help take up the structural strain. These ribs are usually molded in plastic simultaneously with the finished product on small items. On larger surfaces, it has been found desirable that the ribs be made of a suitable material other than the plastic. Such ribs have been glued, screwed, nailed or otherwise attached to the plastic shell. The present invention provides a novel construction and a novel method of manufacture which results in a molded plastic shell having the strengthening ribs permanently bonded thereto so that the ribs become an integral part of the shell structure. While I have shown my invention as applied to the manufacture of a boat, it is obvious that the method can readily be applied to any other similar plastic product.

Figure 4:
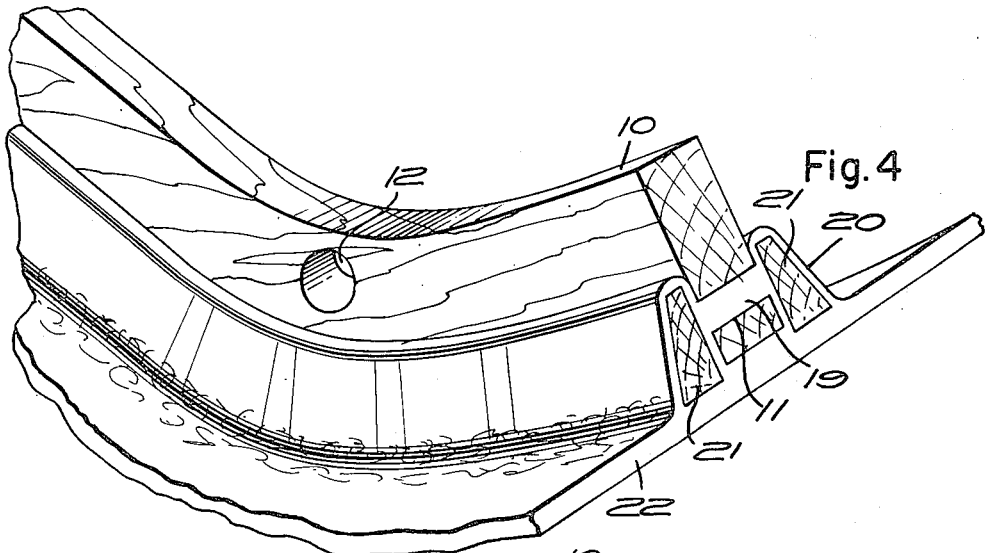
Fig. 4 is a perspective view of the same.

Referring more in detail to the drawings illustrating my invention, Figs. 1 and 2 show the various steps in the method of manufacture of a plastic boat. Step one includes the preparation of the frame as a base or mold for the finished product. I provide structural reinforcing rib members 10, Fig. 2a, made of wood, steel, aluminum or any other suitable material (wood illustrated). The grip members 10 are shaped to conform to the transverse contour of the finished boat. Each rib member 10 has a plurality of spaced holes 11 drilled through them near the outside edge, as shown in Fig. 1. The rib members 10 are set up upside down, as shown in Fig. 1, in spaced relationship in the position they will take in the finished structure. To hold them in this position, a few large holes 12, Fig. 4, are drilled adjacent the inner edges of the rib members 10 and tie rods 13 are passed through the aligned holes. The strips of spacing blocks 14 are inserted between the members and the tie rods are tightened until the members 10 are rigidly held in position. Strips of wood, metal, or plywood 15 are then fastened across the inner edges of the rib members 10, as shown in Fig. 1.

As shown in Fig. 2b, strips of tape 16 are now fastened across the openings 11 of each rib member 10 on both sides thereof to seal off the openings.

A suitable mold material such as plaster of Paris 17 is now used to fill in the intervening spaces between the rib members 10 and the outer surface is faired off smooth and even with the outer edges of the rib members 10, or a split mold made of some durable material may be substituted for quantity production purposes. See Fig. 2c. Note that the tape 16 will prevent the mold material from entering the spaced openings 11 in the rib members 10.

In the next step, the plaster of Paris 17 is scraped away on each side of each rib member 10 and routed out to form grooves 18 of sufficient depth to expose the row of openings 11. The tape 16 is now removed, so that the openings 11 now communicate with the grooves 18 at each end, Fig. 2d.

In the next step, Fig. 2e, each opening 11 is filled with the desired plastic material 19, so that a portion of the plastic material 19 protrudes from both ends of the hole into the grooves 18 on each side. While any suitable type of synthetic resin, such as acetate resin, may be employed, I have obtained best results by the use of a so-called polyester resin. The exact formula for this type of resin varies slightly with the products turned out by different manufacturers. However, it usually comprises a resin of an alkyd-styrene base. This type of resin is manufactured and sold by the Pittsburgh Plate Glass Co., under the trade name of "Selectron 5003," by the American Cyanamid Co., under the trade name of "4116 Laminac," by the Naugatuck Chemical Co., under the trade name "Vibrin," and by the Marco Chemical Corp., under the trade name "Marco MR Resins." In general, such resins are mixtures of unsaturated or polyester alcohols and unsaturated carboxylic acid polyester, copolymerizing with monomeric unnaturated material such as styrene. This type of resin usually requires the use of a catalysing agent such as "Uniperox 60," a catalysing agent comprising an organic peroxide such as tertiary butyl hydro peroxide or a lauroyl peroxide. The final cure is carried on either at elevated temperatures between 200–300° F. for five minutes to one hour. Resins of the type which are self curing (so called room temperature curing) may also be used.

In the present invention, I preferably employ with the synthetic resins above described, a filler such as a glass filler called "Fiberglas" mat or cloth, but in addition thereto, linen cloth, cotton cloth, chopped glass, sisal or any other fibrous or powdered material may be employed.

In the next step, referring to Fig. 2f, strips of resin impregnated mat or cloth 20, as above described, are laid over the exposed edges of the rib members 10 and pushed into the grooves and around the exposed ends of the fillers 19 in the holes 11, the strips 20 being centered so that an equal portion of the strips extend on each side beyond the grooves.

Fillets 21, of any suitable material, shaped to fit the grooves 18, are now driven into the grooves as shown in Fig. 2g, forcing the strips 20 firmly into the grooves so that close contact is made and held against the resin mixture 19 protruding from the holes 11. In this position, enough of the strips 20 is left extending out over the surface of the mold on each side of the grooves to present a surface against which the final layer of resinous strips will form a good bond, see Fig. 2h.

In the final step of forming the structure, large sheets of resin impregnated material 22, as described above, are laid over the entire structure in a plurality of layers to form a laminate, the number of the layers varying with the desired thickness at any point in the structure. The final laminate may be worked over and pressed out to make sure that all the air is squeezed out from between the layers. In this manner, the entire laminate is unified and is then cured by either polymerizing at room temperature, or by polymerizing them at elevated temperatures as hereinabove described.

Figure 3:
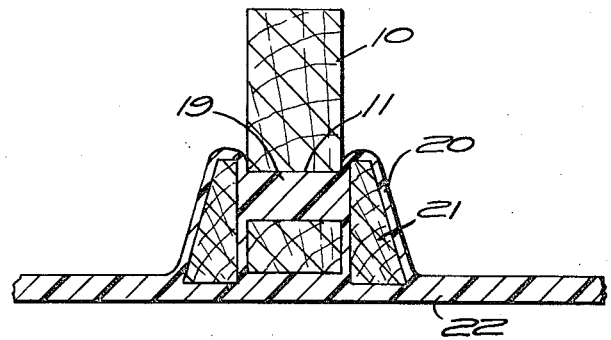
Fig. 3 is an enlarged cross sectional view of one of the bonded joints.
Figure 5:
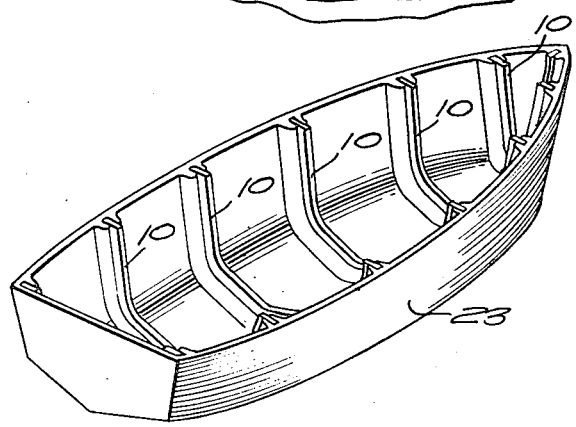
Fig. 5 is a perspective view showing the inside of a boat constructed in accordance with the present invention.

The mold structure is now removed by stripping the plywood sheets 15 from the interior of the boat, breaking up and removing the plaster of Paris 17, and removing the space blocks 14 and tie rods 13. As a result of the above described method, a permanent bonded joint is made between the outer plastic surface of the boat hull and the structural reinforcing rib members 10. Referring to Figs. 3, 4 and 5, it can readily be seen that the rib members 10 have become a permanent and integral part of the boat structure. Note that the plastic material is bonded in an unbroken line around the fillets 21 and through each hole 11, all continuous with the surface construction. Since the portions extending through the openings 11, as shown in Figs. 3 and 4, are multiplied at each opening 11 of the rib 10 as shown in Fig. 1, it can be readily seen that rib 10 cannot be removed without breaking the boat structure itself.

The final boat construction shown in Fig. 5 shows an outer boat hull 23 made of a single unitary piece of plastic material of any desired thickness and provided with a plurality of spaced transverse ribs 10, each rib being permanently bonded to the boat so that it has become an integral part thereof. While I have shown the ribs 10 as being positioned transversely, it is obvious that they can similarly be positioned longitudinally or the hull may have a combination of transverse and longitudinal ribs or stringers.

The advantages of the above method of manufacture and of the resultant structure are readily apparent.

I have provided a large plastic shell construction in which the strengthening ribs have been preformed to the desired shape and have been selected for a particular job and have been integrated with the finished shell as a permanent part thereof. The resultant structure will withstand pounding with large sledge hammers. It will not break or crack and will carry a large load. It is also obviously light in proportion to its size. The method of manufacture above described is simple and easy to carry out. No special molds are required, as by the use of this method the structure itself is made to form its own mold. The process is, therefore, comparatively rapid and inexpensive to carry out.

While I have described a specific article and a specific method of manufacture, it is obvious that changes may be made in the size, shape or relative arrangement of parts or in the method of manufacture without departing from the spirit and scope of the invention as defined in the appended claims.

I claim:

1. The method of forming a plastic shell having reinforcing ribs comprising the steps of locking the ribs in spaced relation and inverted position, filling the spaces between said ribs with plaster of Paris, fairing the surface of the plaster of Paris smooth and even with the edges of said ribs to form a mold surface, covering said surface with successive sheets of a polyester resin of an alkyd-styrene base having a fibrous filler to form a plastic laminate, polymerizing said laminate by the application of heat, and removing said plaster of Paris.

2. The method of forming a plastic shell having reinforcing ribs comprising the steps of cutting a plurality of openings adjacent one edge of each rib, locking the ribs in spaced relation, covering the openings in said ribs, filling the space between said ribs with a mold material, fairing the surface of the mold material smooth and even with the edges of said ribs to form a mold surface, gouging out the mold material on each side of each rib to expose the openings, removing the coverings from said openings, filling said openings with a thermosetting plastic material, covering the mold surface with a thermosetting plastic material joined to the material in said openings, setting said plastic, and removing said mold material.

3. The method of forming a plastic shell having reinforcing ribs comprising the steps of cutting a plurality of openings adjacent one edge of each rib, locking the ribs in spaced relation, covering the openings in said ribs, filling the space between said ribs with plaster of Paris, fairing the surface of the plaster of Paris smooth and even with the edges of said ribs to form a mold surface, gouging out the plaster of Paris on each side of each rib to expose the openings, removing the coverings from said openings, filling said openings with a thermosetting plastic material, covering the mold surface with successive sheets of a thermosetting plastic material to form a plastic laminate joined to the plastic material in said openings, setting said plastic, and removing said plaster of Paris.

4. The method of forming a plastic shell having reinforcing ribs comprising the steps of cutting a plurality of openings adjacent one edge of each rib, locking the ribs in spaced relation, covering the openings in said ribs, filling the space between said ribs with plaster of Paris, fairing the surface of the plaster of Paris smooth and even with the edges of said ribs to form a mold surface, gouging out the plaster of Paris on each side of each rib to expose the openings, removing the coverings from said openings, filling said openings with a polyester resin of an alkyd styrene base having a fibrous filler, covering the mold surface with successive sheets of a polyester resin of an alkyd styrene base having a fibrous filler to form a plastic laminate joined to the plastic material in said openings, setting said plastic, and removing said plaster of Paris.

5. The method of forming a plastic shell having reinforcing ribs comprising the steps of cutting a plurality of openings adjacent one edge of each rib, locking the ribs in spaced relation, covering the openings in said ribs, filling the space between said ribs with a mold material, fairing the surface of the mold material smooth and even with the edges of said ribs to form a mold surface, gouging out the mold material on each side of each rib to expose the openings, removing the coverings from said openings, filling said openings with a thermosetting plastic material, covering the edge of each rib and the gouged out portion of said mold with a sheet of thermosetting plastic material in contact with the material in said openings, inserting a fillet into said gouged out portion lined with said plastic material, covering the mold surface, the edges of said ribs and said fillets with a thermosetting plastic material joined to the material surrounding said fillets, setting said plastic, and removing said mold material.

6. The method of forming a plastic shell having reinforcing ribs comprising the steps of cutting a plurality of openings adjacent one edge of each rib, locking the ribs in spaced relation, covering the openings in said ribs, filling the space between said ribs with plaster of Paris, fairing the surface of the plaster of Paris smooth and even with the edges of said ribs to form a mold surface, gouging out the plaster of Paris on each side of each rib to expose the openings, removing the coverings from said openings, filling said openings with a thermosetting plastic material, covering the edge of each rib and gouged out portion of said mold with a sheet of thermosetting plastic material in contact with the material in said openings, inserting a fillet into said gouged out portion lined with said plastic material, covering the mold surface and the edges of said ribs with successive sheets of a thermostatic plastic material to form a plastic laminate joined to the material surrounding said fillets, setting said plastic, and removing said plaster of Paris.

7. The method of forming a plastic shell having reinforcing ribs comprising the steps of cutting a plurality of openings adjacent one edge of each rib, locking the ribs in spaced relation, covering the openings in said ribs, filling the space between said ribs with plaster of Paris, fairing the surface of the plaster of Paris smooth and even with the edges of said ribs to form a mold surface, gouging out the plaster of Paris on each side of each rib to expose the openings, removing the coverings from said openings, filling said openings with a polyester resin of an alkyd styrene base having a fibrous filler, covering the edge of each rib and gouged out portion of said mold with a sheet of a polyester resin of an alkyd styrene base having a fibrous filler in contact with the material in said openings, inserting a fillet into said gouged out portion lined with said plastic material, covering the mold surface and the edges of said ribs with successive sheets of a polyester resin of an alkyd styrene base having a fibrous filler, to form a plastic laminate joined to the material surrounding said fillets, setting said plastic, and removing said plaster of Paris.

8. A structurally reinforced plastic shell construction comprising a plastic shell, a plurality of spaced reinforcing ribs in said shell, said ribs conforming to the contour of said shell, said ribs each having a plurality of spaced openings adjacent the edges of said ribs abutting said shell, and plastic material integral with said shell extending around the edges of each rib and through said rib openings.

9. A structurally reinforced plastic shell construction comprising a plastic shell made of a polyester resin of an alkyd styrene base with a fibrous filler, a plurality of spaced wooden reinforcing ribs in said shell, said ribs conforming to the contour of said shell, said ribs each having a plurality of spaced openings adjacent the edges of said ribs abutting said shell and a polyester resin material having a fibrous filler similar to and integral with said shell extending around the edges of each rib and through said rib openings.

10. A structurally reinforced plastic shell construction comprising a plastic shell, a plurality of spaced reinforcing ribs in said shell, said ribs conforming to the contour of said shell, said ribs each having a plurality of spaced openings adjacent the edges of said ribs abutting said shell, a fillet extending in spaced parallel relation on each side of each rib adjacent the spaced openings therein, and plastic material integral with such shell extending around the edges of each rib and through said rib openings and around said fillets.

11. A structurally reinforced plastic shell construction comprising a plastic shell made of a polyester resin of an alkyd styrene base and a "Fiberglas" mat filler, a plurality of spaced wooden reinforcing ribs in said shell, said ribs conforming to the contour of said shell, said ribs each having a plurality of spaced openings adjacent the edges of said ribs abutting said shell, a fillet extending in spaced parallel relation on each side of each rib adjacent the spaced openings, and a polyester resin material with a "Fiberglas" mat filler similar to and integral with said shell extending around the edges of each rib and through said rib openings and around each fillet.

12. A boat hull comprising an integral unitary hull made of a polyester resin of an alkyd styrene base with a filler of a fibrous material, and spaced wooden reinforcing ribs extending transversely across the interior of said hull, said hull material extending integrally through openings adjacent the abutting edges of said ribs, whereby said ribs are integrally bonded to said hull.

No references cited.